US012767781B2

(12) United States Patent
White et al.

(10) Patent No.: US 12,767,781 B2
(45) Date of Patent: Oct. 20, 2026

(54) CATALYTIC OXIDATIVE DEPOLYMERIZATION PROCESS

(71) Applicant: Basell Poliolefine Italia S.r.l., Milan (IT)

(72) Inventors: Daniel F. White, Houston, TX (US); Sandor Nagy, Seabrook, TX (US); Christopher D. Smith, Kingwood, TX (US); David L. Ramage, Friendswood, TX (US); Noel C. Hallinan, Loveland, OH (US)

(73) Assignee: Basell Poliolefine Italia S.r.l., Milan (IT)

( * ) Notice: Subject to any disclaimer, the term of this patent is extended or adjusted under 35 U.S.C. 154(b) by 560 days.

(21) Appl. No.: 18/454,847

(22) Filed: Aug. 24, 2023

(65) Prior Publication Data

US 2024/0076467 A1 Mar. 7, 2024

Related U.S. Application Data

(60) Provisional application No. 63/400,816, filed on Aug. 25, 2022.

(51) Int. Cl.

| | |
|---|---|
| ***C08J 11/16*** | (2006.01) |
| ***B01J 6/00*** | (2006.01) |
| ***B01J 35/40*** | (2024.01) |
| ***B01J 37/00*** | (2006.01) |
| ***B01J 37/04*** | (2006.01) |

(52) U.S. Cl.

CPC ............... *C08J 11/16* (2013.01); *B01J 6/001* (2013.01); *B01J 35/40* (2024.01); *B01J 37/0036* (2013.01); *B01J 37/04* (2013.01)

(58) Field of Classification Search

USPC ........................................................... 521/41

See application file for complete search history.

(56) References Cited

U.S. PATENT DOCUMENTS

| | | | |
|---|---|---|---|
| 5,545,787 | A | 8/1996 | Cooper et al. |
| 6,087,545 | A | 7/2000 | Choudhary et al. |
| 11,046,892 | B1 | 6/2021 | Sofranko et al. |
| 2008/0164443 | A1 | 7/2008 | White et al. |
| 2015/0307418 | A1 | 10/2015 | Frey et al. |

FOREIGN PATENT DOCUMENTS

| | | | | |
|---|---|---|---|---|
| CN | 1304341 | A | 7/2001 | |
| CN | 101116827 | A * | 2/2008 | |
| CN | 102241833 | A | 11/2011 | |
| EP | 3873889 | A1 | 9/2021 | |
| JP | S59111815 | A | 6/1984 | |
| JP | 2005139440 | A | 6/2005 | |
| JP | 2005169293 | A | 6/2005 | |
| JP | 2014177523 | A | 9/2014 | |
| WO | 2004071656 | A1 | 8/2004 | |
| WO | WO-2019125979 | A1 * | 6/2019 | .............. B01J 21/18 |
| WO | 2020231488 | A1 | 11/2020 | |
| WO | 2021048187 | A1 | 3/2021 | |
| WO | 2022132671 | A1 | 6/2022 | |

OTHER PUBLICATIONS

CN-101116827-A Machine Translation (Year: 2008).*

The International Search Report and The Written Opinion for PCT/EP2023/073286 mailed Jan. 4, 2024.

Rodrigues Ana Sofia et al: “Perovskites (La, Ba) (Fe, Ti) O 3 : AO7 photocatalysis under visible light” Reviews on Advanced Materials Science, vol. 59, No. 1, Jan. 1, 2020 (Jan. 1, 2020), pp. 151-159.

Jeon Wonjin et al: “Alkaline wet oxidation of lignin over Cu—Mn mixed oxide catalysts for production of vanillin”, Catalysis Today, vol. 352, Aug. 1, 2020 (Aug. 1, 2020), pp. 95-103.

Aoki A et al: “Preparation of Y?Ba?Cu oxide precursor by the citrate gel process”, Journal of Non-Crystalline Solids, North-Holland Physics Publishing. Amsterdam, NL, vol. 147-148, Jan. 1, 1992 (Jan. 1, 1992), pp. 720-723.

Catalytic properties of lanthanum strontium transition metal oxides (La1—xSrxBO3; B=manganese, iron, cobalt, nickel) for toluene oxidation.

* cited by examiner

*Primary Examiner* — Terressa Boykin

(57) ABSTRACT

Catalytic compositions for depolymerizing polyolefin-based waste material into useful petrochemical products and methods of use are described. The catalytic compositions are mixed metal oxides demonstrating equal or higher conversion than noncatalytic pyrolysis. These mixed metal oxide catalysts and a polyolefin-based material are heated in the presence of oxygen to form a product comprising one or more olefin monomers.

20 Claims, 2 Drawing Sheets

CATALYTIC OXIDATIVE DEPOLYMERIZATION PROCESS

CROSS-REFERENCE TO RELATED APPLICATIONS

The application claims the benefit of priority to U.S. Provisional Patent Application No. 63/400,816, filed on Aug. 25, 2022, which is incorporated herein by reference in its entirety.

FIELD OF THE INVENTION

The disclosure relates to methods of depolymerizing polyolefin-based material using a mixture of metal oxides and/or metal carbonates to form useful petrochemical products, such as olefin monomers.

BACKGROUND OF THE INVENTION

Heightened standards of living and increased urbanization have led to an increased demand for polymer products, particularly polyolefin plastics. Polyolefins have been frequently used in commercial plastics applications because of their outstanding performance and cost characteristics. Polyethylene (PE), for example, has become one of the most widely used and recognized polyolefins because it is strong, extremely tough, and very durable. This allows for it to be highly engineered for a variety of applications. Similarly, polypropylene (PP) is mechanically rugged yet flexible, is heat resistant, and is resistant to many chemical solvents like bases and acids. Thus, it is ideal for various end-use industries, mainly for packaging and labeling, textiles, plastic parts, and reusable containers of various types.

The downside to the demand for polyolefin plastics is the increase in waste. Post-consumer plastic waste typically ends up in landfills, with about 12% being incinerated and about 9% being diverted to recycling. In landfills, most plastics do not degrade quickly, becoming a major source of waste that overburdens the landfill. Incineration is also not an ideal solution to treating the plastic wastes as incineration leads to the formation of carbon dioxide and other greenhouse gas emissions. As such, there has been much interest in developing methods of recycling plastic waste to reduce the burden on landfills while being environmentally friendly.

A drawback to the recycling of plastic wastes is the difficulty in successfully producing commercially usable or desirable products. Plastic waste recycling currently includes washing the material and mechanically reprocessing it; however, the resulting pellets remain contaminated with impurities such as food residue, dyes, and perfume. These impurities render the pellets undesirable for many uses based on both performance and appearance.

Recent advances have focused on converting plastic waste to useable products like fuel sources or commercially important raw materials. Methods of performing pyrolysis of the plastic waste stream followed by catalytic depolymerization have been developed to generate various products: gases, gasoline fractions, kerosene fractions, diesel fractions, and waxes.

Reduction of temperature and/or time of depolymerization while generating an attractive composition of liquids are the two key drivers of catalysts for thermal decomposition of waste plastic. Acidic aluminosilicate catalysts with proprietary additives show good activity, but result in branched paraffins and olefins which are less attractive steam cracking feedstock compared to the unbranched isomers.

Despite the advances made in recycling polymers, there is a continued need for the development of a robust processes for the conversion of plastics to useful petrochemical products, such as maximizing the recovery of olefin monomers. It would further be desirable to reduce the time and/or temperature required for depolymerization of polyolefin-based waste to produce a product comprising a desirable amount of one or more olefin monomers.

SUMMARY OF THE INVENTION

The present disclosure provides novel catalyst compositions and methods for thermally depolymerizing polyolefin-based material in the presence of oxygen and optionally with a mixed metal oxide catalyst. The presently disclosed catalyst compositions are mixtures of catalyst components that have a synergistic effect for increasing the rate of the depolymerization reactions at a reduced temperature.

In some embodiments, the catalyst composition disclosed herein comprises a mixed metal oxide, $$M_x^1 M_y^2 O_z.$$

$M^1$ comprises a molecule of barium titanate, strontium, lanthanum, iron, molybdenum, manganese, bismuth, yttrium, or scandium, and x is the number of molecules of $M^1$. $M^2$ comprises a molecule of strontium, lanthanum, copper, barium, manganese, or magnesium, and y is the number of molecules of $M^2$. The number of oxygen molecules to charge balance x molecules of $M^1$ and y molecules of $M^2$ in the mixed metal oxide is indicated by subscript z. $M^1$ is different than $M^2$ in the mixed metal oxide composition.

In some embodiments, the process disclosed herein comprises adding a polyolefin-based feed stream and a reaction medium comprising nitrogen and oxygen to a first pyrolysis reaction zone to form a first reaction mixture. The first reaction mixture under depolymerization conditions to form a first depolymerization product, wherein the first depolymerization product comprises a first content of one or more olefin monomers. The first depolymerization product from the first pyrolysis reaction zone. In some embodiments, the process further comprises adding a first catalyst, as described herein, to the pyrolysis reaction zone, wherein reacting the reaction mixture further forms a first spent catalyst. The first spent catalyst is withdrawn from the pyrolysis reaction zone separately from the first depolymerization product. In further embodiments, the process further comprises adding the first spent catalyst to a first oxidation reaction zone. The first spent catalyst is reacted with oxygen under oxidation conditions to form a first re-oxidized catalyst and a first solid draw. The first re-oxidized catalyst is added to the first reaction zone. In some embodiments, the process further comprises one or more additional depolymerization reaction zones, there the product of an upstream depolymerization reaction zone is the feed for a downstream depolymerization reaction zone. Each additional depolymerization reaction zone can optionally have a corresponding oxidation reaction zone to re-oxidize spent catalyst for feeding back to the associated depolymerization reaction zone.

In some embodiments, a depolymerization system comprises a pyrolysis reaction zone to beat a mixture a polyolefin-based waste, nitrogen, oxygen, and optionally a first catalyst composition, as disclosed herein, to form a first depolymerization product and optionally, a spent catalyst, wherein the first product comprises a first content of one or more olefin monomers. Further embodiments can comprise one or more additional pyrolysis reaction zones to further process the first depolymerization product with additional catalyst to produce a second depolymerization product and a spent catalyst. Alternatively, or in combination with the one or more additional pyrolysis reaction zones, further embodiments can comprise one or more oxidation reaction zones to re-oxidize spent catalyst to feed back to the one or more pyrolysis reaction zones.

The foregoing has outlined rather broadly the features and technical advantages of the present invention in order that the detailed description of the invention that follows may be better understood. Additional features and advantages of the invention will be described hereinafter, which form the subject matter of the claims of the invention. It should be appreciated by those skilled in the art that the conception and specific embodiments disclosed may be readily utilized as a basis for modifying or designing other catalyst compositions and/or processes for carrying out the same purposes of the present invention. It should also be realized by those skilled in the art that such equivalent constructions do not depart from the spirit and scope of the invention as set forth in the appended claims. The novel features which are believed to be characteristic of the invention, both as to its compositions and methods, together with further objects and advantages will be better understood from the following description.

BRIEF DESCRIPTION OF THE FIGURES

The claimed subject matter may be understood by reference to the following description taken in conjunction with the accompanying drawings, in which like reference numerals identify like elements, and in which:

Figure 1:
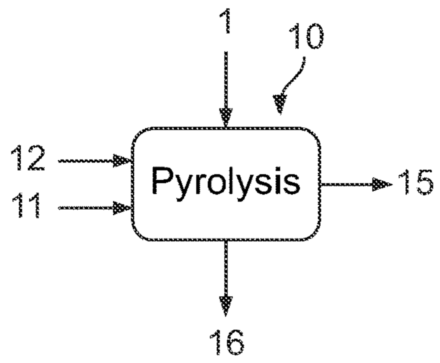
FIG. 1 is a simplified flow diagram of the disclosed process having one depolymerization reaction zone according to embodiments of the invention.

While the disclosed process and composition are susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the subject matter claimed below will now be disclosed. In the interest of clarity, some features of some actual implementations may not be described in this specification. It will be appreciated that in the development of any such actual embodiments, numerous implementation-specific decisions must be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

Definitions

As used herein, "aerogel" refers to a light, highly porous solid material of extremely low density, produced by removal of the liquid component from a conventional gel and replacement of such liquid component in the conventional gel with a gas so that the resulting solid is the same size as the original.

As used herein, "char" refers to coke, a carbon-containing solid, that accumulates on the catalyst particles during pyrolysis.

As used herein, "feed stream" refers to a supply of polyolefin-based material for depolymerization. Depending on the depolymerization unit, the feed stream can be a continuous supply of material or a batch of material. The feed stream can be pure polyolefins or can be a mix of polyolefins with non-polyolefin components.

As used herein, "free liquid" means a composition where a liquid can be readily separated from a solid portion of the composition at standard temperature (~20° C.) and pressure (101 kPa).

As used herein, "non-polyolefin components" refers to material present in a polyolefin-based feed, or waste, stream that can reduce the abilities of a zeolite to catalyze the depolymerization of the polyolefins that are present in the stream. Examples of non-polyolefin components include non-polyolefinic polymers with high oxygen and/or nitrogen content.

As used herein, "post-consumer waste" refers to a type of waste produced by the end consumer of a material stream.

As used herein, "post-industrial waste" refers to a type of waste produced during the production process of a product.

As used herein, "reaction zone" refers to a chamber sufficiently enclosed to maintain selected operating conditions within the chamber to produce a desired reaction, such as a pyrolysis reaction zone or an oxidation reaction zone. In some embodiments, each reaction zone can be a separate reactor. In some embodiments, a single vessel can contain a plurality of reaction zones.

As used herein, "residence time" refers to the time needed to depolymerize a batch of polymer waste in a depolymerization unit.

As used herein, "thermolysis" refers to a thermal depolymerization reaction occurring in the absence of oxygen.

As used herein, "waste stream" is a type of feed stream comprising material that has been discarded as no longer useful, including but not limited to, post-consumer and post-industrial waste.

As used herein, the terms "depolymerization half time" or "half time of depolymerization" refer to the time needed to achieve a 50% loss of mass of a sample at a specific temperature during a TGA thermolysis reactions. The depolymerization half time is related to the residence time that would be needed for large scale industrial depolymerization reactors.

The term "pure" as used in reference to the feed stream refers to a feed that is 100% polyolefin, but does not mean that the feed contains only one type of polyolefin. Rather, a "pure" feed stream can have a mixture of polyolefins such as low-density polyethylene, high density polyethylene, polypropylene and combinations thereof.

The terms "polyolefin-based" and "polyolefin-rich", in reference to materials, feed streams, or waste streams, are used interchangeable to refer to a mixture that is at least 80% polyolefin.

All concentrations herein are by weight percent ("wt. %") unless otherwise specified.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed and excludes all additional elements.

The phrase "consisting essentially of" excludes additional material elements but allows the inclusions of non-material elements that do not substantially change the nature of the invention.

The phrase "substantially all of" means greater than or equal to 95 wt %, greater than or equal to 99 wt %, greater than or equal to 99.5 wt %, or greater than or equal to 99.9 wt %.

The following abbreviations are used herein:

| ABBREVIATION | TERM |
|---|---|
| HDPE | High density polyethylene |
| PP | Polypropylene |
| sccm | standard cubic centimeter per minute @ 0° C./32° F. |
| TGA | Thermogravimetric Gravimetric Analysis |

-continued

| ABBREVIATION | TERM |
|---|---|
| vol % | volume percent |
| wt % | weight percent |

Catalyst Composition

In some embodiments, a catalyst composition for depolymerizing polymers comprises a mixed metal oxide, $$M_x^1 M_y^2 O_z,$$

wherein:

- $M^1$ comprises a molecule of barium titanate, strontium, lanthanum, iron, molybdenum, manganese, bismuth, yttrium, or scandium;
- x is the number of molecules of $M^1$;
- $M^2$ comprises a molecule of strontium, lanthanum, copper, barium, manganese, or magnesium;
- y is the number of molecules of $M^2$;
- z is the number of oxygen molecules to charge balance x molecules of $M^1$ and y molecules of $M^2$ in the mixed metal oxide; and
- $M^1$ is different than $M^2$.

In some embodiments, $M^1$ and $M^2$ are defined by one or more of the following:

a) $M^1$ is barium titanate and $M^2$ is lanthanum;
b) $M^1$ is lanthanum and $M^2$ is strontium;
c) $M^1$ is iron and $M^2$ is copper;
d) $M^1$ is molybdenum and $M^2$ is barium;
e) $M^1$ is manganese and $M^2$ is lanthanum;
f) $M^1$ is barium titanate and $M^2$ is strontium;
g) $M^1$ is molybdenum and $M^2$ is manganese;
h) $M^1$ is bismuth and $M^2$ is iron;
i) $M^1$ is molybdenum and $M^2$ is strontium;
j) $M^1$ is strontium and $M^2$ is lanthanum;
k) $M^1$ is lanthanum and $M^2$ is magnesium;
l) $M^1$ is neodymium and $M^2$ is calcium;
m) $M^1$ is scandium and $M^2$ is barium; and
n) $M^1$ is yttrium and $M^2$ is barium.

In some embodiments, the mixed metal oxide is the reaction product of a solid state process performed on an oxide of a first metal $M^1$ and a carbonate of a second metal $M^2$. The oxide of a first metal and the carbonate of the second metal are mixed and ground to form a uniform powder at a temperature in the range of from 15° C. to 30° C. or 20° C. to 25° C. In some embodiments, grinding is sufficient such that the powder has a particle size less than or equal to 1 mm or in the range of from 1 μm to 400 μm. In some embodiments, mixing is such that substantially all of the oxide of $M^1$ and the carbonate of $M^2$ will react during calcination. The powder is then calcined at a temperature and for a time sufficient to form the mixed metal oxide as the reaction product of the oxide of $M^1$ and the carbonate of $M^2$. In some embodiments, calcining is performed at a temperature greater than or equal to 600° C. for a time greater than or equal to 5.5 hours, a temperature greater than or equal to 700° C. for a time greater than or equal to 4.5 hours, or a temperature greater than or equal to 800° C. for a time greater than or equal to 3.5 hours.

In some embodiments, the mixed metal oxide is formed by the solid state process, wherein $M^1$ and $M^2$ are defined by one or more of the following:

a) $M^1$ is barium titanate and $M^2$ is lanthanum;
b) $M^1$ is lanthanum and $M^2$ is strontium;

c) $M^1$ is molybdenum and $M^2$ is barium;
d) $M^1$ is manganese and $M^2$ is lanthanum;
e) $M^1$ is barium titanate and $M^2$ is strontium;
f) $M^1$ is molybdenum and $M^2$ is manganese;
g) $M^1$ is molybdenum and $M^2$ is strontium;
h) $M^1$ is strontium and $M^2$ is lanthanum;
i) $M^1$ is lanthanum and $M^2$ is magnesium;
j) $M^1$ is neodymium and $M^2$ is calcium;
k) $M^1$ is scandium and $M^2$ is barium; and
l) $M^1$ is yttrium and $M^2$ is barium.

In some embodiments, the mixed metal oxide is formed in the solid state process, wherein $M^1$ and $M^2$ are defined by one or more of the following:

a) $M^1$ is barium titanate and $M^2$ is lanthanum;
b) $M^1$ is lanthanum and $M^2$ is strontium;
c) $M^1$ is strontium and $M^2$ is lanthanum; and
d) $M^1$ is molybdenum and $M^2$ is barium.

In some embodiments, the solid state process is performed on a mixture of SrO and $La_2(CO_3)_3$, a mixture of $La_2O_3$ and $SrCO_3$, or a combination thereof.

In some embodiments, the mixed metal oxide is formed in the solid state process, $M^1$ is lanthanum, $M^2$ is strontium, and the molar ratio of the oxide of $M^1$ to the carbonate of $M^2$ is in the range of from 7:10 to 9:5.

In some embodiments, the mixed metal oxide is formed in the solid state process, $M^1$ is strontium, $M^2$ is lanthanum, and the molar ratio of the oxide of $M^1$ to the carbonate of $M^2$ is in the range of from 2:3 to 1:3.

In some embodiments, the mixed metal oxide is formed in the solid state process, $M^1$ is barium titanate, $M^2$ is lanthanum, and the molar ratio of the oxide of $M^1$ to the carbonate of $M^2$ is in the range of from 2:3 to 3:2.

In some embodiments, the mixed metal oxide is formed in the solid state process, $M^1$ is molybdenum, $M^2$ is barium, and the molar ratio of the oxide of $M^1$ to the carbonate of $M^2$ is in the range of from 2:3 to 3:2.

In some embodiments, the mixed metal oxide is the reaction product of a citrate solution process performed on a nitrate of a first metal $M^1$ and a nitrate of a second metal $M^2$. The nitrates of $M^1$ and $M^2$, water, and a citric acid are mixed to form a solution, wherein the amount of citric acid is greater than or equal to the amount of $M^1$ and $M^2$ on a molar basis. In some embodiments, the mixing is performed at a temperature in the range of from 15° C. to 30° C. or 20° C. to 25° C. The oxide of a first metal and the carbonate of the second metal are mixed and ground to form a uniform powder at a temperature in the range of from 15° C. to 30° C. or 20° C. to 25° C. The solution is then evaporated at a first temperature and for a first time sufficient to drive off free liquid to form a gel. In some embodiments, evaporation is performed at a temperature greater than or equal to 80° C. for a time greater than or equal to 12 hours. The gel is then decomposed at a second temperature and for second time sufficient to decompose the gel to form an aerogel. In some embodiments, decomposition is performed at a temperature greater than or equal to 150° C. for a time greater than or equal to 1 hour. The aerogel is then ground to produce a powder. In some embodiments, the aerogel is ground sufficiently to produce a powder having a particle size less than or equal to 1 mm or in the range of from 1 μm to 400 μm. The powder is then calcined at a temperature and for a time sufficient to form the mixed metal oxide as the reaction product of the oxide of $M^1$ and the carbonate of $M^2$. In some embodiments, calcining is performed at a temperature greater than or equal to 600° C. for a time greater than or equal to 5.5 hours, a temperature greater than or equal to 700° C. for a time greater than or equal to 4.5 hours, or a temperature greater than or equal to 800° C. for a time greater than or equal to 3.5 hours.

In some embodiments, the citrate solution process is performed on a mixture of nitrates of iron and copper, a mixture of nitrates of bismuth and iron, or a combination thereof.

In some embodiments, the mixed metal oxide is formed in the citrate solution process, $M^1$ is iron, $M^2$ is copper, and the molar ratio of the nitrate of $M^1$ to the nitrate of $M^2$ is in the range of from 2:3 to 3:2.

In some embodiments, the mixed metal oxide is formed in the citrate solution process, $M^1$ is bismuth, $M^2$ is iron, and the molar ratio of the nitrate of $M^1$ to the nitrate of $M^2$ is in the range of from 2:3 to 3:2.

Depolymerization Process

In some embodiments, a depolymerization process comprises adding a polyolefin-based feed stream and a reaction medium comprising nitrogen and oxygen to a first pyrolysis reaction zone to form a first reaction mixture. The first reaction mixture is reacted under depolymerization conditions to form a first depolymerization product. The first depolymerization product is withdrawn from the first pyrolysis reaction zone. The first depolymerization product comprises a first content of one or more olefin monomers. In some embodiments, the polyolefin-based feed stream comprises a post-consumer recyclate, a post-industrial recyclate, or a combination thereof. In some embodiments, the polyolefin-based feed stream comprises one or more high density polyethylenes, one or more polypropylenes, or a combination thereof. In some embodiments, the depolymerization conditions comprise a temperature in the range of from 250° C. to 450° C., from 280° C. to 420° C., or from 280° C. to 350° C. a pressure in the range of from 0.5 barg (50 kPa) to 3.5 barg (350 kPa) or from 1.0 barg (100 kPa) to 3.0 barg (300 kPa), and a reaction medium comprising nitrogen and up to 20 vol % oxygen, up to 10 vol % oxygen, up to 8 vol % oxygen, or up to 5 vol % oxygen, based on the total volume of the nitrogen and oxygen, or a combination thereof.

In some embodiments, the process further comprises adding a first catalyst to the pyrolysis reaction zone. The first reaction mixture, further comprising the first catalyst, reacts under depolymerization conditions to further form a first spent catalyst. The first spent catalyst is withdrawn from the pyrolysis reaction zone separately from the first depolymerization product. The first catalyst is selected from the catalysts described herein.

In some embodiments, the process further comprises adding the first spent catalyst to a first oxidation reaction zone. The first spent catalyst is reacted with oxygen under oxidation conditions to form a first re-oxidized catalyst and a first solid draw. The first re-oxidized catalyst is added to the to the first depolymerization reaction zone. In some embodiments, the oxidation conditions comprise a temperature in the range of from 500° C. to 800° C., a pressure in the range of from 0.5 barg (50 kPa) to 3.5 barg (350 kPa), and a reaction medium comprising nitrogen and oxygen in an amount greater than or equal to 5 vol %, or in the range of from 6 vol % to 50 vol % or from 7 vol % to 21 vol %, based on the total volume of the nitrogen and oxygen.

In some embodiments, the process further comprises adding the first depolymerization product and a reaction medium comprising nitrogen and oxygen to a second pyrolysis reaction zone to form a second reaction mixture. The second reaction mixture is reacted under depolymerization conditions to form a second depolymerization product. The second depolymerization product is withdrawn from the second pyrolysis reaction zone. The second depolymerization product comprises a second content of one or more olefin monomers, and the second content is greater than the first content of one or more olefin monomers in the first depolymerization product. In some embodiments, the depolymerization conditions comprise a temperature in the range of from 250° C. to 450° C., from 280° C. to 420° C., or from 280° C. to 350° C. a pressure in the range of from 0.5 barg (50 kPa) to 3.5 barg (350 kPa) or from 1.0 barg (100 kPa) to 3.0 barg (300 kPa), and a reaction medium comprising nitrogen and up to 20 vol % oxygen, up to 10 vol % oxygen, up to 8 vol % oxygen, or up to 5 vol % oxygen, based on the total volume of the nitrogen and oxygen, or a combination thereof.

In some embodiments, the process further comprises adding a second catalyst to the pyrolysis reaction zone. The second reaction mixture, further comprising the second catalyst, reacts under depolymerization conditions to further form a second spent catalyst. The second spent catalyst is withdrawn from the pyrolysis reaction zone separately from the second depolymerization product. The second catalyst is selected from the catalysts described herein and can be the same or different from the first catalyst.

In some embodiments, the process further comprises adding the second spent catalyst to a second oxidation reaction zone. The second spent catalyst is reacted with oxygen under oxidation conditions to form a second re-oxidized catalyst and a second solid draw. The second re-oxidized catalyst is added to the to the second depolymerization reaction zone. In some embodiments, the oxidation conditions comprise a temperature in the range of from 500° C. to 800° C., a pressure in the range of from 0.5 barg (50 kPa) to 3.5 barg (350 kPa), and a reaction medium comprising nitrogen and oxygen in an amount greater than or equal to 5 vol %, or in the range of from 6 vol % to 50 vol % or from 7 vol % to 21 vol %, based on the total volume of the nitrogen and oxygen.

Single stage pyrolysis can be accomplished by co-feeding waste plastic with a controlled amount of oxygen and catalyst. FIG. 1 shows an embodiment comprising a single pyrolysis reaction zone 10. Polyolefin-based feed stream 1, optionally a catalyst 11, and a reaction medium 12, comprising nitrogen and up to 5 vol % oxygen (based on total volume of nitrogen and oxygen), are added to pyrolysis reaction zone 10 where the mixture is subjected to depolymerization conditions, as described herein, to produce a pyrolysis product 15 and optionally spent catalyst 16.

Figure 2:
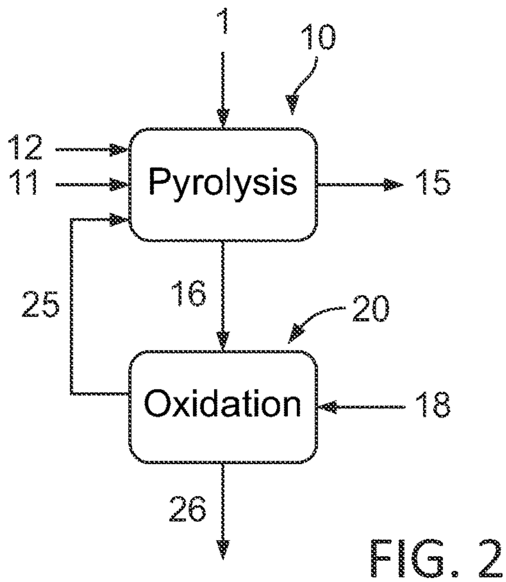
FIG. 2 is a simplified flow diagram of the disclosed process having one depolymerization reaction zone and one oxidation reaction zone according to embodiments of the invention.

Single stage pyrolysis can be accomplished by co-feeding waste plastic with an oxidized catalyst and reoxidation of spent catalyst/char by air in a separate reactor or reaction zone. Fluidized catalytic cracking ("FCC") type units can be considered for implementation. FIG. 2 shows an embodiment comprising a single pyrolysis reaction zone 10 and a single oxidation reaction zone 20. Polyolefin-based feed stream 1, catalyst 11, and a reaction medium 12, comprising nitrogen and up to 5 vol % oxygen (based on total volume of nitrogen and oxygen), are added to pyrolysis reaction zone 10 where the mixture is subjected to depolymerization conditions, as described herein, to produce a pyrolysis product 15 and spent catalyst 16.

Spent catalyst 16 is withdrawn from the pyrolysis reaction zone 10 and fed with air and/or oxygen 18 to an oxidation reaction zone 20 where the mixture is subjected to oxidation conditions to produce re-oxidized catalyst 25 and char 26. Re-oxidized catalyst 25 is added to the first pyrolysis reaction zone 10.

Figure 3:
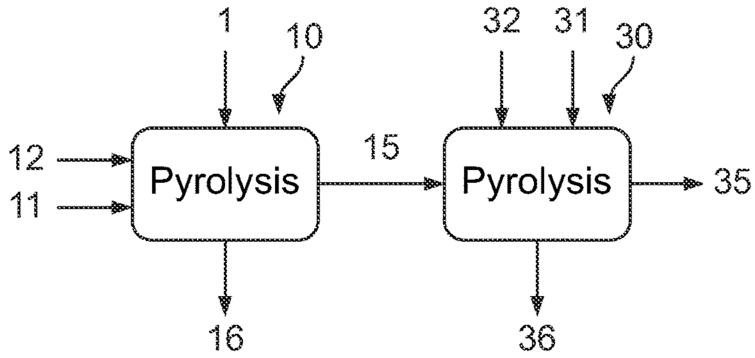
FIG. 3 is a simplified flow diagram of the disclosed process having two depolymerization reaction zones according to embodiments of the invention.

Two stage pyrolysis can be accomplished when a thermal, optionally catalytic cracking step, is followed by another thermal, optionally oxidative catalytic cracking step. FIG. 3 shows an embodiment comprising a first pyrolysis reaction zone 10 and a second pyrolysis reaction zone 30 in series. Polyolefin-based feed stream 1, optionally a first catalyst 11, and a first reaction medium 12, comprising nitrogen and up to 5 vol % oxygen (based on total volume of nitrogen and oxygen), are added to pyrolysis reaction zone 10 where the mixture is subjected to first depolymerization conditions, as described herein, to produce a pyrolysis product 15 and optionally a first spent catalyst 16.

The first pyrolysis product 15, optionally a second catalyst 31, and a second reaction medium 32, comprising nitrogen and up to 5 vol % oxygen (based on total volume of nitrogen and oxygen), are added to pyrolysis reaction zone 30 where the mixture is subjected to second depolymerization conditions, as described herein, to produce a pyrolysis product 15 and optionally a second spent catalyst 16.

The first catalyst 11 and the second catalyst 31, the first reaction medium 12 and the second reaction medium 32, and/or the first depolymerization conditions and the second depolymerization conditions, can each independently be the same or different.

Figure 4:
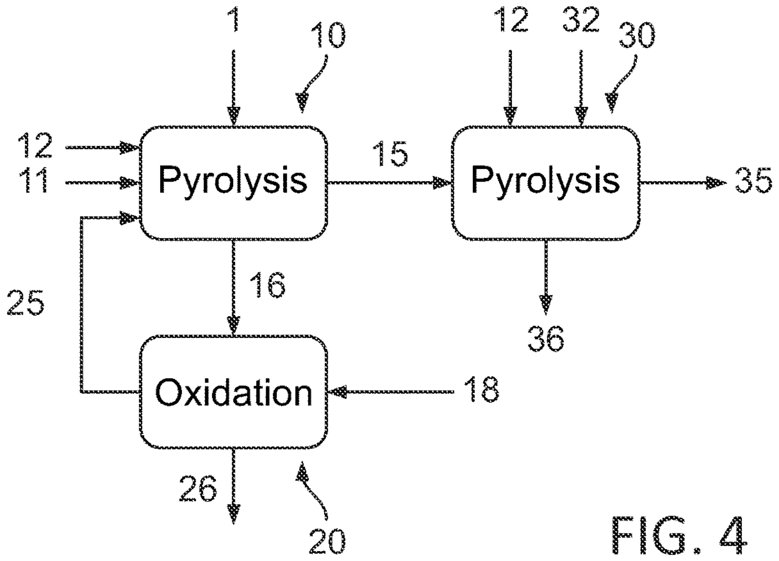
FIG. 4 and FIG. 5 are alternative simplified flow diagrams of the disclosed process having two depolymerization reaction zones and one oxidation reaction zone according to embodiments of the invention.

FIG. 4 shows an embodiment comprising a first pyrolysis reaction zone 10 and a second pyrolysis reaction zone 30 in series, with re-oxidation of spent catalyst 16 from the first pyrolysis reaction zone 10 in an oxidation zone 20. Polyolefin-based feed stream 1, a first catalyst 11, and a first reaction medium 12, comprising nitrogen and up to 5 vol % oxygen (based on total volume of nitrogen and oxygen), are added to pyrolysis reaction zone 10 where the mixture is subjected to first depolymerization conditions, as described herein, to produce a pyrolysis product 15 and a first spent catalyst 16.

The first pyrolysis product 15, optionally a second catalyst 31, and a second reaction medium 32, comprising nitrogen and up to 5 vol % oxygen (based on total volume of nitrogen and oxygen), are added to pyrolysis reaction zone 30 where the mixture is subjected to second depolymerization conditions, as described herein, to produce a pyrolysis product 35 and optionally a second spent catalyst 36.

Spent catalyst 16 is withdrawn from the pyrolysis reaction zone 10 and fed with air and/or oxygen 18 to an oxidation reaction zone 20 where the mixture is subjected to oxidation conditions to produce re-oxidized catalyst 25 and char 26. Re-oxidized catalyst 25 is added to the second pyrolysis reaction zone 10.

The first catalyst 11 and the second catalyst 31, the first reaction medium 12 and the second reaction medium 32, and/or the first depolymerization conditions and the second depolymerization conditions, can each independently be the same or different.

Figure 5:
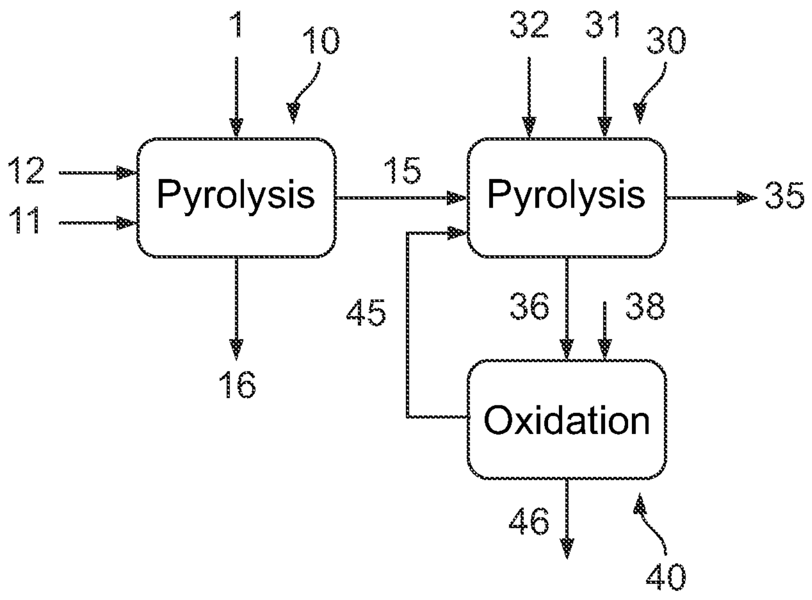

FIG. 5 shows an embodiment comprising a first pyrolysis reaction zone 10 and a second pyrolysis reaction zone 30 in series, with re-oxidation of spent catalyst 36 from the second pyrolysis reaction zone 30 in an oxidation zone 40. Polyolefin-based feed stream 1, optionally a first catalyst 11, and a first reaction medium 12, comprising nitrogen and up to 5 vol % oxygen (based on total volume of nitrogen and oxygen), are added to pyrolysis reaction zone 10 where the mixture is subjected to first depolymerization conditions, as described herein, to produce a pyrolysis product 15 and optionally a first spent catalyst 16.

The first pyrolysis product 15, a second catalyst 31, and a second reaction medium 32, comprising nitrogen and up to 5 vol % oxygen (based on total volume of nitrogen and oxygen), are added to pyrolysis reaction zone 30 where the mixture is subjected to second depolymerization conditions, as described herein, to produce a pyrolysis product 35 and spent catalyst 36.

Spent catalyst 36 is withdrawn from the second pyrolysis reaction zone 30 and fed with air and/or oxygen 38 to an oxidation reaction zone 40 where the mixture is subjected to oxidation conditions to produce re-oxidized catalyst 45 and char 46. Re-oxidized catalyst 45 is added to the second pyrolysis reaction zone 30.

The first catalyst 11 and the second catalyst 31, the first reaction medium 12 and the second reaction medium 32, and/or the first depolymerization conditions and the second depolymerization conditions, can each independently be the same or different.

Figure 6:
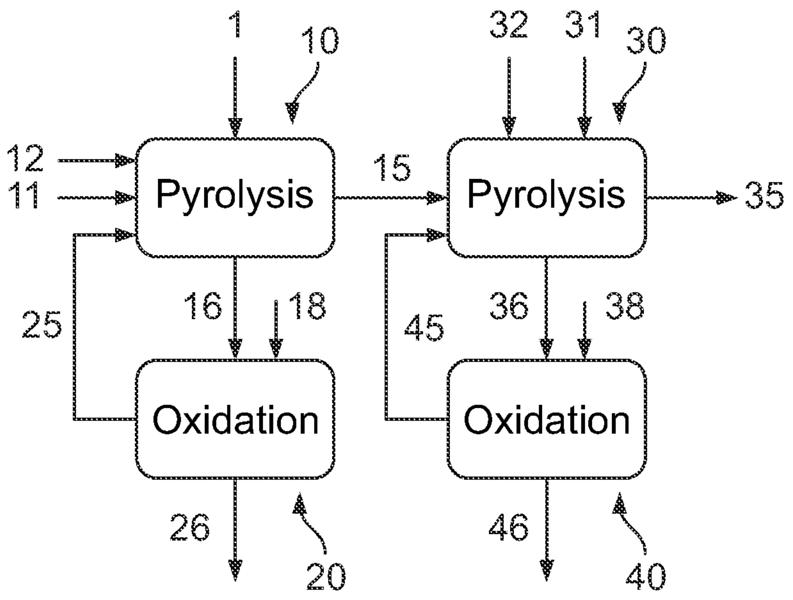
FIG. 6 is a simplified flow diagram of the disclosed process having two depolymerization reaction zones and two oxidation reaction zones according to embodiments of the invention.

FIG. 6 shows an embodiment comprising a first pyrolysis reaction zone 10 and a second pyrolysis reaction zone 30 in series, with re-oxidation of spent catalyst 16 withdrawn from the first pyrolysis reaction zone 10 in a first oxidation zone 20 and with re-oxidation of spent catalyst 36 withdrawn from the second pyrolysis reaction zone 30 in a second oxidation zone 40. Polyolefin-based feed stream 1, a first catalyst 11, and a first reaction medium 12, comprising nitrogen and up to 5 vol % oxygen (based on total volume of nitrogen and oxygen), are added to pyrolysis reaction zone 10 where the mixture is subjected to first depolymerization conditions, as described herein, to produce a pyrolysis product 15 and spent catalyst 16.

The first pyrolysis product 15, a second catalyst 31, and a second reaction medium 32, comprising nitrogen and up to 5 vol % oxygen (based on total volume of nitrogen and oxygen), are added to pyrolysis reaction zone 30 where the mixture is subjected to second depolymerization conditions, as described herein, to produce a pyrolysis product 35 and spent catalyst 36.

Spent catalyst 16 is withdrawn from the pyrolysis reaction zone 10 and fed with air and/or oxygen 18 to an oxidation reaction zone 20 where the mixture is subjected to oxidation conditions to produce re-oxidized catalyst 25 and char 26. Re-oxidized catalyst 25 is added to the first pyrolysis reaction zone 10.

Spent catalyst 36 is withdrawn from the second pyrolysis reaction zone 30 and fed with air and/or oxygen 38 to an oxidation reaction zone 40 where the mixture is subjected to oxidation conditions to produce re-oxidized catalyst 45 and char 46. Re-oxidized catalyst 45 is added to the second pyrolysis reaction zone 30.

The first catalyst 11 and the second catalyst 31, the first reaction medium 12 and the second reaction medium 32, the first depolymerization conditions and the second depolymerization conditions, and/or the first oxidation conditions and the second oxidation conditions, can each independently be the same or different.

Depolymerization Process

In some embodiments, a depolymerization system comprises a first pyrolysis reaction zone to heat a mixture of a polyolefin-based waste material, nitrogen, oxygen, and optionally a first catalyst composition and to form a first product and optionally a first spent catalyst, wherein the first product comprises a first content of one or more olefin monomers.

In some embodiments, a depolymerization system further comprises a first oxidation reaction zone, wherein the first spent catalyst received from the first pyrolysis reaction zone is reacted with oxygen to produce a re-oxidized catalyst to be sent to the first pyrolysis reaction zone.

In some embodiments, a depolymerization system comprises a second pyrolysis reaction zone to heat a mixture of the first depolymerization product, nitrogen, oxygen, and optionally a second catalyst to form a second depolymerization product and optionally a second spent catalyst, wherein the second product comprises a second content of one or more olefin monomers, and the second content is greater than the first content.

In some embodiments, a depolymerization system comprises a second oxidation reaction zone, wherein the second spent catalyst received from the second pyrolysis reaction zone is reacted with oxygen to produce a re-oxidized catalyst to be sent to the second pyrolysis reaction zone.

Certain Embodiments

In a first group of embodiments, a catalyst composition for depolymerizing polymers comprises a mixed metal oxide, $$M^1_x M^2_y O_z,$$

wherein:

- $M^1$ comprises a molecule of barium titanate, strontium, lanthanum, iron, molybdenum, manganese, bismuth, yttrium, or scandium;
- x is the number of molecules of $M^1$;
- $M^2$ comprises a molecule of strontium, lanthanum, copper, barium, manganese, or magnesium;
- y is the number of molecules of $M^2$;
- z is the number of oxygen molecules to charge balance x molecules of $M^1$ and y molecules of $M^2$ in the mixed metal oxide; and
- $M^1$ is different than $M^2$.

In second group of embodiments, $M^1$ and $M^2$ of the mixed metal oxide are defined by one or more of the following:

a) $M^1$ is barium titanate and $M^2$ is lanthanum;
b) $M^1$ is lanthanum and $M^2$ is strontium;
c) $M^1$ is iron and $M^2$ is copper;
d) $M^1$ is molybdenum and $M^2$ is barium;
e) $M^1$ is manganese and $M^2$ is lanthanum;
f) $M^1$ is barium titanate and $M^2$ is strontium;
g) $M^1$ is molybdenum and $M^2$ is manganese;
h) $M^1$ is bismuth and $M^2$ is iron;
i) $M^1$ is molybdenum and $M^2$ is strontium;
j) $M^1$ is strontium and $M^2$ is lanthanum;
k) $M^1$ is lanthanum and $M^2$ is magnesium;
l) $M^1$ is neodymium and $M^2$ is calcium;
m) $M^1$ is scandium and $M^2$ is barium; and
n) $M^1$ is yttrium and $M^2$ is barium.

In some embodiments, the mixed metal oxide is the reaction product of a solid state process performed on an oxide of a first metal $M^1$ and a carbonate of a second metal $M^2$. The oxide of a first metal and the carbonate of the second metal are mixed and ground to form a uniform powder at a temperature in the range of from 15° C. to 30° C. or 20° C. to 25° C. In some embodiments, grinding is sufficient such that the powder has a particle size less than or equal to 1 mm or in the range of from 1 μm to 400 μm. In some embodiments, mixing is such that substantially all of the oxide of $M^1$ and the carbonate of $M^2$ will react during calcination. The powder is then calcined at a temperature and for a time sufficient to form the mixed metal oxide as the reaction product of the oxide of $M^1$ and the carbonate of $M^2$. In some embodiments, calcining is performed at a temperature greater than or equal to 600° C. for a time greater than or equal to 5.5 hours, a temperature greater than or equal to 700° C. for a time greater than or equal to 4.5 hours, or a temperature greater than or equal to 800° C. for a time greater than or equal to 3.5 hours.

In a third group of embodiments, $M^1$ and $M^2$ of the mixed metal oxide are defined by one or more of the following:

a) $M^1$ is barium titanate and $M^2$ is lanthanum;
b) $M^1$ is lanthanum and $M^2$ is strontium;
c) $M^1$ is molybdenum and $M^2$ is barium;
d) $M^1$ is manganese and $M^2$ is lanthanum;
e) $M^1$ is barium titanate and $M^2$ is strontium;
f) $M^1$ is molybdenum and $M^2$ is manganese;
g) $M^1$ is molybdenum and $M^2$ is strontium;
h) $M^1$ is strontium and $M^2$ is lanthanum;
i) $M^1$ is lanthanum and $M^2$ is magnesium;
j) $M^1$ is neodymium and $M^2$ is calcium;
k) $M^1$ is scandium and $M^2$ is barium; and
l) $M^1$ is yttrium and $M^2$ is barium.

In a fourth group of embodiments, $M^1$ and $M^2$ of the mixed metal oxide are defined by one or more of the following:

a) $M^1$ is barium titanate and $M^2$ is lanthanum;
b) $M^1$ is lanthanum and $M^2$ is strontium;
c) $M^1$ is strontium and $M^2$ is lanthanum; and
d) $M^1$ is molybdenum and $M^2$ is barium.

In some embodiments, the mixed metal oxide of the first, second, third, or fourth group of embodiments is formed by a solid state process, comprising:

a) obtaining an oxide of $M^1$ and a carbonate of $M^2$;
b) mixing and grinding a selected molar ratio of the oxide of $M^1$ and the carbonate of $M^2$ to form a uniform powder, in some embodiments, according to one or more of the following:
   i) mixing and grinding at a temperature in the range of from 15° C. to 30° C. or 20° C. to 25° C.;
   ii) the powder has a particle size less than or equal to 1 mm or in the range of from 1 μm to 400 μm; and
   iii) mixing is such that substantially all of the oxide of $M^1$ and the carbonate of $M^2$ will react during calcination. The powder is then calcined at a temperature and for a time sufficient to form the mixed metal oxide as the reaction product of the oxide of $M^1$ and the carbonate of $M^2$; and
c) calcining the powder at a temperature and for a time sufficient to form the mixed metal oxide as the reaction product of the oxide of $M^1$ and the carbonate of $M^2$, in some embodiments, according to one of the following:
   i) at a temperature greater than or equal to 600° C. for a time greater than or equal to 5.5 hours;
   ii) at a temperature greater than or equal to 700° C. for a time greater than or equal to 4.5 hours; or
   iii) at a temperature greater than or equal to 800° C. for a time greater than or equal to 3.5 hours.

In some embodiments, the mixed metal oxide of the first, second, third, or fourth group of embodiments is formed by a citrate solution process, comprising:

a) obtaining a nitrate of $M^1$ and a nitrate of $M^2$;
b) mixing the nitrate of $M^1$, the nitrate of $M^2$, water, and a citric acid in an amount greater than or equal to the amount of $M^1$ and $M^2$ on a molar basis to form a solution, in some embodiments, at a temperature in the range of from 15° C. to 30° C. or 20° C. to 25° C.;
c) evaporating the solution at a first temperature and for a first time sufficient to drive off free liquid to form a gel, in some embodiments, at a temperature greater than or equal to 60° C. for a time greater than or equal to 24 hours or in the range of from 80° C. to 100° C. for a time greater than or equal to 12 hours;
d) decomposing the gel at a second temperature and for second time sufficient to form an aerogel, in some embodiments, at a temperature greater than or equal to 140° C. for a time greater than or equal to 2 hours or in the range of from 150° C. to 180° C. for a time greater than or equal to 1 hour;
e) grinding the aerogel to form a powder, in some embodiments, to produce a powder having a particle size less than or equal to 1 mm or in the range of from 1 μm to 400 μm; and
f) calcining the mixture at a temperature and for a time sufficient to form the mixed metal oxide, in some embodiments, according to one of the following:
   i) at a temperature greater than or equal to 600° C. for a time greater than or equal to 5.5 hours;
   ii) at a temperature greater than or equal to 700° C. for a time greater than or equal to 4.5 hours; or
   iii) at a temperature greater than or equal to 800° C. for a time greater than or equal to 3.5 hours.

The presently disclosed catalyst compositions and methods of using such catalyst compositions to depolymerize polyolefin-based feed streams are exemplified with respect to the examples below. These examples are included to demonstrate embodiments of the appended claims. However, these are exemplary only, and the invention can be broadly applied to any combination of polyolefin-based feed, with and without non-polyolefin components, and composite catalyst. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Raw Materials

Raw materials used herein are shown in Table 1, below.

TABLE 1

| Composition | Description | Available from |
|---|---|---|
| Metal oxides | purity ≥99.5% | Sigma Aldrich, St. Louis, MO |
| Metal carbonates | purity ≥99.5% | Sigma Aldrich, St. Louis, MO |
| Metal nitrates | purity ≥99.5% | Sigma Aldrich, St. Louis, MO |

TABLE 1-continued

| Composition | Description | Available from |
|---|---|---|
| High Density Polyethylene (HDPE) | Hostalen™ ACP9 255 | LyondellBasell, Houston, TX |
| Polypropylene (PP) | Moplen™ HP522H | LyondellBasell, Houston, TX |

Synthesis of Mixed Oxides

Solid State Synthesis of Mixed Metal Oxides

Samples of 2.5 g of mixed metal oxides and carbonates were prepared in which the oxide/carbonate molar equivalency was varied from 1:2 to 2:1. The appropriate masses of oxide and carbonate were combined in a stainless vial equipped with a ball pestle and then mixed in a Wig-L-Bug™ grinder/shaker (available from Thermo Fisher Scientific, Richardson, TX) for 15 minutes. The mixed sample was then removed and placed in a porcelain evaporation dish for calcination. In some cases, the grinding/shaking led to cementing of the mixture to the inner wall of the vial, requiring the use of a spatula to chip out the material. The mixed metal oxide samples were calcined at 800° C. for 3.5 hours, allowed to cool, and transferred to sample vials.

Synthesis of Mixed Metal Oxides Using the Citrate Solution

Mixed metal oxides of the indicated nominal composition were prepared by evaporation of aqueous solutions of corresponding nitrates and equimolar amount of citric acid to metals at 80° C. in air for 12 hours, followed by decomposition in an oven at 150° C. for 1 hour. The resulting aerogels were ground and the resulting powders calcined at 600° C. or 800° C. for 4 hours. The resulting materials were ground once more and used as depolymerization catalysts: $Fe_2CoO_4$ [Ex. 43], $Fe_2MnO_4$ [Ex. 27], $Fe_2CuO_4$ [Ex. 5], $La_2MoO_6$ [Ex. 44], $SrMoO_4$ [Ex. 28].

TGA Depolymerization Kinetics Tests

Uniformly mixed samples of approximately 5 g of polyolefin-based feed, required amount of catalyst, and optional additives were prepared by melt-compounding in a HAAK MiniCTW compounder at 200° C. and 200 rpm for 5 minutes. The resulting extrudates were heated under nitrogen or air at 10° C./min. to a specified depolymerization temperature in a Mettler Toledo TGA/DSC 3+(available from Mettler Toledo, Columbus, OH) and held for 1 hour. TGA tests were performed by holding the sample at a depolymerization temperature of 400° C. for one hour under nitrogen or 300° C. for one hour under air (approximately 78 vol % nitrogen and approximately 21 vol % oxygen). The depolymerization efficiency was quantified using the weight loss of polyolefin-based feed sample (conversion to lower molecular weight components) during the one-hour isothermal test.

The mixed oxides were compounded and tested by TGA method using a 1:1 mixture of HDPE and PP under $N_2$ purge at 400° C. and air (approximately 78 vol % nitrogen and approximately 21 vol % oxygen) purge at 300° C. Baseline experiments indicated that switching the purge gas from $N_2$ to air allowed a reduction in the hold temperature while achieving a similar level of weight loss (conversion to lower molecular weight components) in 1 hour.

For the $N_2$ experiments, where the kinetics approximately followed a first order rate dependence, the half weight loss time ($t_{1/2}$) was used to quantify the effect of catalyst on the rate, where $t_{1/2}$ is the time in minutes for conversion of half the weight of the sample. The data presented in Table 2 was checked and no significant rate increase was found based on the TGA method.

TABLE 2 shows the performance of certain purchased metal oxides and mixed metal oxides produced by both solid state and citrate solution methods. Each first catalyst component comprises a group 2 alkaline earth metal oxide, a group 2 alkaline earth metal carbonate, or a combination thereof. Each second catalyst component comprises a group 3 metal oxide, a group 3 metal carbonate, or a combination thereof.

For TGA tests performed in air, when the rate vs. time was observed to significantly deviate from a first order kinetics, the depolymerization efficiency was quantified using the conversion of the material in 1 hour at a specific temperature of 300° C.

Examples 1-55 in TABLE 2 show the conversion of a HDPE/PP (1:1) feed using certain metal oxides and mixed metal oxides synthesized by sold state or citrate solution processes. Example 19 shows pyrolysis conversion without catalyst and is used for a benchmark for mixed metal oxides. Table 2 is sorted by the last column, reflecting conversion of HDPE/PP (1:1) feed with a catalyst at 300° C. for 1 hour. Examples 1-18 all equal or better conversion than Example 19, and even for equal conversion, the depolymerization products are expected to have a different composition.

TABLE 2

| Ex. | Metal Oxide | Molar Ratio* | MMO Prep. | $t_{1/2}$ ($N_2$ @ 400° C.) | Accel. vs. no cat. ($N_2$ @ 400° C.) | Conv. wt % ($N_2$ @ 400° C.) | Conv. wt % (air @ 300° C.) | Accel. vs. no cat. (air @ 300° C.) |
|---|---|---|---|---|---|---|---|---|
| 1 | $Ba_2TiO_3 + La_2(CO_3)_3$ | 1:1 | Solid State | 96 | 1 | 35 | 31 | 1.41 |
| 2 | $La_2O_3 + SrCO_3$ | 1:1 | Solid State | 61 | 1.6 | 45 | 30 | 1.36 |
| 3 | $SrO + La_2(CO_3)_3$ | 1:2 | Solid State | 68 | 1.4 | 44 | 29.3 | 1.33 |
| 4 | $MoO_3 + BaCO_3$ | 1:1 | Solid State | 69 | 1.4 | 44 | 28 | 1.27 |
| 5 | $Fe_2CuO_4$ | 1:1 | Citrate Soln. | 79 | 1.2 | 40 | 28 | 1.27 |
| 6 | $La_2O_3 + SrCO_3$ | 1:1.5 | Solid State | 67 | 1.4 | 44 | 27 | 1.23 |
| 7 | $Mn_2O_3 + La_2(CO_3)_3$ | 1:1 | Solid State | 73 | 1.3 | — | 26 | 1.18 |
| 8 | $BaTiO_3 + SrCO_3$ | 1:1 | Solid State | 91 | 1 | — | 25 | 1.14 |
| 9 | $MoO_3 + MnCO_3$ | 1:1 | Solid State | 71 | 1.3 | — | 25 | 1.14 |
| 10 | $Y_2O_3$ | N/A | Purchased | 75 | 1.3 | — | 25 | 1.14 |
| 11 | $La_2O_3 + MgCO_3$ | 1:1 | Solid State | 88 | 1.1 | — | 24 | 1.09 |

TABLE 2-continued

| Ex. | Metal Oxide | Molar Ratio* | MMO Prep. | $t_{1/2}$ ($N_2$ @ 400° C.) | Accel. vs. no cat. ($N_2$ @ 400° C.) | Conv. wt % ($N_2$ @ 400° C.) | Conv. wt % (air @ 300° C.) | Accel. vs. no cat. (air @ 300° C.) |
|---|---|---|---|---|---|---|---|---|
| 12 | $Nd_2O_3 + CaCO_3$ | 1:1 | Solid State | 69 | 1.4 | — | 24 | 1.09 |
| 13 | $La_2O_3 + SrCO_3$ | 1:1.7 | Solid State | 69 | 1.4 | — | 23 | 1.05 |
| 14 | $MoO_3 + SrCO_3$ | 1:1 | Solid State | 74 | 1.3 | — | 22 | 1 |
| 15 | $Bi_2O_3$ | N/A | Purchased | 65 | 1.5 | — | 22 | 1 |
| 16 | $La_2O_3 + SrCO_3$ | 1:1.9 | Solid State | 64 | 1.5 | — | 22 | 1 |
| 17 | $Sc_2O_3 + BaCO_3$ | 1:1 | Solid State | 80 | 1.2 | — | 22 | 1 |
| 18 | $Y_2O_3 + BaCO_3$ | 1:1 | Solid State | 71 | 1.3 | — | 22 | 1 |
| 19 | None | 1:1 | N/A | — | — | 35 | 22 | 1 |
| 20 | $BaTiO_3$ | N/A | Purchased | 94 | 1 | 35 | 21 | 0.95 |
| 21 | CuO | N/A | Purchased | 69 | 1.4 | — | 21 | 0.95 |
| 22 | BaO | N/A | Purchased | 65 | 1.5 | 46 | 21 | 0.95 |
| 23 | $Nd_2O_3 + MgCO_3$ | 1:1 | Solid State | 75 | 1.3 | — | 21 | 0.95 |
| 24 | $La_2O_3 + BaCO_3$ | 1:1 | Solid State | 68 | 1.4 | — | 20 | 0.91 |
| 25 | $Y_2O_3 + SrCO_3$ | 1:0.5 | Solid State | 67 | 1.4 | — | 20 | 0.91 |
| 26 | $La_2O_3 + CaCO_3$ | 1:2 | Solid State | 92 | 1 | — | 20 | 0.91 |
| 27 | $Fe_2MnO_4$ | 1:1 | Citrate Soln. | 85 | 1.1 | — | 19 | 0.86 |
| 28 | $SrMoO_4$ | 1:1 | Citrate Soln. | 74 | 1.3 | — | 19 | 0.86 |
| 29 | SrO | N/A | Purchased | 69 | 1.4 | 43 | 19 | 0.86 |
| 30 | $SrO + La_2(CO_3)_3$ | 1:1 | Solid State | 73 | 1.3 | 42 | 19 | 0.86 |
| 31 | $SrO + La_2(CO_3)_3$ | 1:0.5 | Solid State | 76 | 1.2 | 41 | 19 | 0.86 |
| 32 | $Sc_2O_3 + SrCO_3$ | 1:1 | Solid State | 82 | 1.2 | — | 19 | 0.86 |
| 33 | $La_2O_3 + CaCO_3$ | 1:1 | Solid State | 81 | 1.2 | — | 19 | 0.86 |
| 34 | $Fe_2O_3$ | N/A | Purchased | 78 | 1.2 | 41 | 18 | 0.82 |
| 35 | $Bi_2O_3 + CoCO_3$ | 1:1 | Solid State | 70 | 1.4 | — | 18 | 0.82 |
| 36 | $La_2O_3$ | N/A | Purchased | 72 | 1.3 | 42 | 18 | 0.82 |
| 37 | $MoO_3 + La_2(CO_3)_3$ | 1:1 | Solid State | 70 | 1.4 | — | 18 | 0.82 |
| 38 | $Cu_2O + MnCO_3$ | 1:1 | Solid State | 75 | 1.3 | — | 18 | 0.82 |
| 39 | $La_2O_3 + SrCO_3$ | 1:0.7 | Solid State | 62 | 1.5 | — | 18 | 0.82 |
| 40 | $Sc_2O_3 + SrCO_3$ | 1:2 | Solid State | 85 | 1.1 | — | 18 | 0.82 |
| 41 | $Sc_2O_3 + SrCO_3$ | 1:0.5 | Solid State | 81 | 1.2 | — | 18 | 0.82 |
| 42 | $Nd_2O_3 + SrCO_3$ | 1:2 | Solid State | 64 | 1.5 | — | 18 | 0.82 |
| 43 | $Sc_2O_3$ | N/A | Purchased | 86 | 1.1 | — | 18 | 0.82 |
| 44 | $Fe_2CoO_4$ | 1:1 | Citrate Soln. | 81 | 1.2 | — | 18 | 0.82 |
| 45 | $La_2MoO_6$ | 1:1 | Citrate Soln. | 83 | 1.1 | — | 18 | 0.82 |
| 46 | $MoO_3$ | N/A | Purchased | 141 | 0.7 | 26 | 17 | 0.77 |
| 47 | $MoO_3 + CoCO_3$ | 1:1 | Solid State | 79 | 1.2 | — | 17 | 0.77 |
| 48 | $CuO + MnCO_3$ | 1:1 | Solid State | 74 | 1.3 | — | 17 | 0.77 |
| 49 | $Nd_2O_3 + SrCO_3$ | 1:1 | Solid State | 64 | 1.5 | — | 17 | 0.77 |
| 50 | $Nd_2O_3 + SrCO_3$ | 1:0.5 | Solid State | 66 | 1.4 | — | 17 | 0.77 |
| 51 | $Nd_2O_3$ | N/A | Purchased | 68 | 1.4 | — | 17 | 0.77 |
| 52 | $Sc_2O_3 + MgCO_3$ | 1:1 | Solid State | 95 | 1 | — | 17 | 0.77 |
| 53 | $Sc_2O_3 + CaCO_3$ | 1:1 | Solid State | 90 | 1.1 | — | 17 | 0.77 |
| 54 | $Y_2O_3 + SrCO_3$ | 1:2 | Solid State | 72 | 1.3 | — | 16.4 | 0.75 |
| 55 | CuO | N/A | Purchased | 95 | 1 | 37 | 12 | 0.55 |

*$M^1$ oxide:$M^2$ carbonate or $M^1$ nitrate:$M^2$ nitrate

The depolymerization half time is related to the residence time needed in a large scale depolymerization unit. The shorter the half time, the shorter the residence time for a batch of a polymer feed in a depolymerization unit, and the faster the depolymerization rate.

Quartz Tube Depolymerization Tests

For each experiment, 5 g of polyolefin-based feed, with optional catalyst (5 wt %) was placed in a quartz pyrolysis tube and heated in a furnace at 10° C./min. rate to a furnace setpoint of 700° C. The tube was purged from the bottom with a gas stream of nitrogen or nitrogen with 5 vol oxygen at a flow rate of 15 sccm. The condensable products were collected into a Hickman trap cooled with dry $CO_2$. The temperature of the reaction mixture when the first signs of liquid collection was observed was measured with a thermocouple located at the bottom of the pyrolysis tube.

Quartz tube depolymerization experiments of a (1:1) mixture of HDPE:PP confirm the beneficial effect of using a 5% $O_2/N_2$ purge gas in the presence of $LaSrO_x$ mixed metal oxides based on reduction of the depolymerization onset temperature as shown in TABLE 3. The composition and boiling properties of the light yellow, non-waxy depolymerization liquids on catalytic and non-catalytic depolymerization in the presence of $O_2$ is very similar to the thermolysis liquids generated without catalyst under $N_2$, confirming the mechanism of the process.

TABLE 3

| Catalyst | | None | None | $La_2O_3$ + $SrCO_3$ (1:1) | $MoO_3$ + $BaCO_3$ (1:1) | $Fe_2CuO_4$ |
|---|---|---|---|---|---|---|
| Process Parameters | | | | | | |
| Purge | 15 sccm | $N_2$ | 5% $O_2/N_2$ | 5% $O_2/N_2$ | 5% $O_2/N_2$ | 5% $O_2/N_2$ |
| Onset Temperature | ° C. | 422 | 405 | 344 | 342 | 419 |

TABLE 3-continued

| Catalyst | | None | None | $La_2O_3$ + $SrCO_3$ (1:1) | $MoO_3$ + $BaCO_3$ (1:1) | $Fe_2CuO_4$ |
|---|---|---|---|---|---|---|
| Liquid isolated | g | 3.7 | 2.7 | 3.5 | 3.6 | 3.2 |
| Coke residue | % | 0 | 0 | 0 | 0 | 0 |
| Ash residue | % | 0 | 0 | 0 | 0 | 0 |
| Product Composition by NMR | | | | | | |
| Olefinic proton % | | 8.84 | — | — | 9.22 | 8.82 |
| Type I % | | 3.86 | — | — | 4.05 | 3.61 |
| Type II % | | 1.02 | — | — | 1.11 | 1.07 |
| Type III % | | 0.33 | — | — | 0.38 | 0.34 |
| Type IV % | | 3.63 | — | — | 3.69 | 3.80 |
| Ar. Protons % | | 0.19 | — | — | 0.41 | 0.42 |
| Product Composition by GC | | | | | | |
| $C_2$-$C_4$ | wt % | 0.41 | 0.19 | 0.26 | 0.33 | 0.17 |
| $C_5$ | wt % | 3.65 | 1.29 | 1.66 | 2.24 | 1.02 |
| $C_6$ | wt % | 6.62 | 4.02 | 4.25 | 5.27 | 2.76 |
| $C_7$ | wt % | 4.67 | 4.14 | 3.73 | 4.39 | 3.10 |
| $C_8$ | wt % | 7.86 | 9.00 | 7.79 | 8.24 | 7.42 |
| $C_9$ and heavier | wt % | 76.78 | 81.35 | 82.31 | 79.53 | 85.53 |
| α-olefins | wt % | 18.80 | 16.28 | 19.63 | 20.32 | 19.69 |
| n-paraffins | wt % | 14.69 | 9.18 | 12.52 | 12.69 | 12.60 |
| $C_6$-$C_8$ Aromatics | wt % | 1.17 | 1.40 | 1.19 | 1.32 | 1.15 |

For the sake of brevity, only certain ranges are explicitly disclosed herein. However, in addition to recited ranges, any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the processes, machines, film structures, composition of layers, means, methods, and/or steps described in the specification. As one of the ordinary skill in the art will readily appreciate from the disclosure of the present invention, processes, machines, film structures, composition of layers, means, methods, and/or steps, presently existing or later to be developed that perform substantially the same function or achieve substantially the same result as the corresponding embodiments described herein, may be utilized according to the present invention. Accordingly, the appended claims are intended to include within their scope such processes, machines, film structures, composition of layers, means, methods, and/or steps.

What is claimed is:

1. A catalyst composition for depolymerizing polymers, comprising a mixed metal oxide, $$M_x^1 M_y^2 O_z,$$

wherein:

$M^1$ comprises a molecule of barium titanate, strontium, lanthanum, iron, molybdenum, manganese, bismuth, yttrium, or scandium;

x is the number of molecules of $M^1$;

$M^2$ comprises a molecule of strontium, lanthanum, copper, barium, manganese, or magnesium;

y is the number of molecules of $M^2$;

z is the number of oxygen molecules to charge balance x molecules of $M^1$ and y molecules of $M^2$ in the mixed metal oxide; and $M^1$ is different than $M^2$.

2. The catalyst composition of claim 1, wherein the mixed metal oxide is formed by:

a) obtaining an oxide of $M^1$ and a carbonate of $M^2$;

b) mixing and grinding the oxide of $M^1$ and the carbonate of $M^2$ to form a uniform powder; and c) calcining the powder at a temperature and for a time sufficient to form the mixed metal oxide as the reaction product of the oxide of $M^1$ and the carbonate of $M^2$.

3. The catalyst composition of claim 2, wherein grinding is sufficient such that the powder has a particle size less than or equal to 1 mm.

4. The catalyst composition of claim 2, wherein calcining is performed at a temperature greater than or equal to 800° C. for a time greater than or equal to 3.5 hours.

5. The catalyst composition of claim 1, wherein the mixed metal oxide is formed by:

a) obtaining a nitrate of $M^1$ and a nitrate of $M^2$;

b) mixing the nitrate of $M^1$, the nitrate of $M^2$, water, and a citric acid in an amount greater than or equal to the amount of $M^1$ and $M^2$ on a molar basis to form a solution;

c) evaporating the solution at a first temperature and for a first time sufficient to drive off free liquid to form a gel;

d) decomposing the gel at a second temperature and for second time sufficient to form an aerogel;

e) grinding the aerogel to form a powder; and f) calcining the mixture at a temperature and for a time sufficient to form the mixed metal oxide.

6. The catalyst composition of claim 5, wherein grinding is sufficient such that the powder having a particle size less than or equal to 1 mm.

7. The catalyst composition of claim 5, wherein evaporating is performed at a temperature greater than or equal to 80° C. for a time greater than or equal to 12 hours.

8. The catalyst composition of claim 5, wherein decomposing is performed at a temperature greater than or equal to 150° C. for a time greater than or equal to 1 hour.

9. The catalyst composition of claim 5, wherein calcining is performed at a temperature greater than or equal to 800° C. for a time greater than or equal to 4.0 hours.

10. A process comprising:

a) adding a polyolefin-based feed stream and a reaction medium comprising nitrogen and oxygen to a first pyrolysis reaction zone to form a first reaction mixture;

b) reacting the first reaction mixture under depolymerization conditions to form a first depolymerization product, wherein the first depolymerization product comprises a first content of one or more olefin monomers; and c) withdrawing the first depolymerization product from the first pyrolysis reaction zone.

11. The process of claim 10, further comprising:

a) adding a first catalyst to the first pyrolysis reaction zone, wherein reacting the reaction mixture further forms a first spent catalyst; and b) withdrawing a first spent catalyst from the pyrolysis reaction zone.

12. The process of claim 10, wherein the depolymerization conditions comprise a temperature in the range of from 250° C. to 450° C., a pressure in the range of from 0.5 barg (50 kPa) to 3.5 barg (350 kPa), and a reaction medium comprising nitrogen and up to 20 vol % oxygen, based on the total volume of the nitrogen and oxygen, or a combination thereof.

13. The process of claim 12, wherein the temperature is in the range of from 280° C. to 350° C., a pressure in the range of from 1.0 barg (100 kPa) to 3.0 barg (300 kPa), and a reaction medium comprises nitrogen and up to 10 vol % oxygen, based on the total volume of oxygen and nitrogen.

14. The process of claim 11, further comprising:

a) adding the first spent catalyst to a first oxidation reaction zone;

b) reacting the first spent catalyst with oxygen under oxidation conditions to form a first re-oxidized catalyst and a first solid draw; and b) adding the first re-oxidized catalyst to the first reaction zone.

15. The process of claim 10, further comprising:

a) adding the first depolymerization product and a reaction medium comprising nitrogen and oxygen to a second pyrolysis reaction zone to form a second reaction mixture;

b) reacting the second reaction mixture under depolymerization conditions to form a second depolymerization product, wherein the second depolymerization product comprises a second content of one or more olefin monomers, and the second content is greater than the first content; and c) withdrawing the second depolymerization product from the second pyrolysis reaction zone.

16. The process of claim 15, further comprising:

a) adding a second catalyst to the pyrolysis reaction zone, wherein reacting the reaction mixture further forms a first spent catalyst; and b) withdrawing a first spent catalyst from the pyrolysis reaction zone.

17. The process of claim 16, further comprising:

a) adding the second spent catalyst to a second oxidation reaction zone;

b) reacting the second spent catalyst with oxygen under oxidation conditions to form a second re-oxidized catalyst and a second solid draw; and b) adding the second re-oxidized catalyst to the second reaction zone.

18. A depolymerization system comprising a first pyrolysis reaction zone to heat a mixture of a polyolefin-based waste material, nitrogen, oxygen, and optionally a first catalyst composition and to form a first product and optionally a first spent catalyst, wherein the first product comprises a first content of one or more olefin monomers.

19. The depolymerization system of claim 18, further comprising a first oxidation reaction zone, wherein the first spent catalyst received from the first pyrolysis reaction zone is reacted with oxygen to produce a re-oxidized catalyst to be sent to the first pyrolysis reaction zone.

20. The depolymerization system of claim 18, further comprising a second pyrolysis reaction zone to heat a mixture of the first product, nitrogen, oxygen, and optionally a second catalyst to form a second product and optionally a second spent catalyst, wherein the second product comprises a second content of one or more olefin monomers, and the second content is greater than the first content.

* * * * *